US006664525B2

(12) United States Patent
Schmidtke et al.

(10) Patent No.: US 6,664,525 B2
(45) Date of Patent: Dec. 16, 2003

(54) ADJUSTABLE FOCUS IMAGING DEVICE

(75) Inventors: Gregg S. Schmidtke, Fort Collins, CO (US); Paul C. Coffin, Fort Collins, CO (US); Richard A. Irwin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 09/940,959

(22) Filed: Aug. 27, 2001

(65) Prior Publication Data

US 2003/0038256 A1 Feb. 27, 2003

(51) Int. Cl.$^7$ .................. G02B 27/40; G02B 27/64; G02B 7/04
(52) U.S. Cl. ............... 250/201.2; 250/556; 235/462.22; 396/82
(58) Field of Search ................. 250/555–557, 250/234–235, 201.1, 208.1, 231, 216, 239, 206, 559.3, 201.2, 556; 359/818–819, 821–822; 358/474, 483, 497; 396/80, 82, 74, 180, 121; 235/462.01, 462.22, 462.45, 472.01

(56) References Cited

U.S. PATENT DOCUMENTS

| | | | | |
|---|---|---|---|---|
| 5,296,970 A | * | 3/1994 | Morizumi | 359/700 |
| 5,646,394 A | | 7/1997 | Steinle et al. | 250/208.1 |
| 6,115,552 A | * | 9/2000 | Kaneda | 396/82 |
| 6,118,598 A | * | 9/2000 | Gardner, Jr. | 359/811 |
| 6,147,343 A | | 11/2000 | Christensen | 250/234 |
| 6,265,705 B1 | * | 7/2001 | Gardner, Jr. | 250/208.1 |
| 6,331,714 B1 | * | 12/2001 | Gardner et al. | 250/559.29 |

OTHER PUBLICATIONS

U.S. patent application Ser. No. 08/888,339 filed Jul. 2, 1997 for "Catadioptric Lens System For A Scanning Device" of Ronald K. Kerschner.
U.S. patent application Publication No. US 2002/0134920 A1 published Sep. 26, 2002 for "Method And Apparatus For Setting Focus In An Imaging Device" of Schmidtke et al.

* cited by examiner

*Primary Examiner*—David Porta
*Assistant Examiner*—Patrick J. Lee

(57) ABSTRACT

An imaging apparatus and method in which the focus of the imaging apparatus can be adjusted.

32 Claims, 9 Drawing Sheets

ADJUSTABLE FOCUS IMAGING DEVICE

FIELD OF THE INVENTION

The present invention relates generally to imaging systems and, more specifically, to an adjustable focus imaging device.

BACKGROUND OF THE INVENTION

Imaging devices are used to produce machine-readable image data (image data) that is representative of an image of an object, e.g., a page of printed text. The process of generating image data is sometimes referred to as capturing or imaging an object. One type of imaging device is a photoelectric imaging device. As used herein, the phrase "photoelectric imaging device" means any device that generates image data representative of an image of an object through use of a photosensor array. Examples of photoelectric imaging devices include devices such as camcorders and digital cameras that instantaneously focus an entire image that is to be captured onto a two-dimensional photosensor array. Another example of a photoelectric imaging device is a line-focus system as described below.

Some line-focus systems image an object by sequentially focusing narrow "scan line" portions of the image of the object onto a linear photosensor array by sweeping a scanning head over the object. The scanning head is an imaging device or has an imaging device located therein. Examples of such devices include computer input devices such as optical scanners, which are commonly referred to simply as "scanners". Other examples include facsimile machines and digital copy machines.

A line-focus system is also used in some barcode readers. Generally, in line-focus barcode readers, a narrow portion of a barcode is imaged onto a linear photosensor array. Electrical output from the photosensor array may then be analyzed to read the imaged barcode. Examples of imaging devices that are useable in conjunction with barcode readers are disclosed in U.S. Pat. No. 6,118,598 of Gardner, Jr. for METHOD AND APPARATUS FOR SETTING FOCUS IN AN IMAGING DEVICE and in U.S. patent application Ser. No. 09/290,216, of Gardner, Jr. for ALIGNMENT APPARATUS AND METHOD FOR AN IMAGING SYSTEM, which are both hereby specifically incorporated by reference for all that is disclosed therein.

Referring to FIG. 1, a schematic view of a conventional line-focus system is provided for illustrative purposes. The line-focus system is provided with a light source 308, a plurality of light beams 310, 312, 314, a plurality of reflected light beams 320, 322, 324, a lens assembly 330, a linear photosensor array 340 and a data processing system 370. A use for such a line-focus system is for reading labels, perhaps a barcode 350 located on an object, such as a media storage device 360. The distance between the lens assembly 330 and the barcode 350 may be referred to as the object distance Lo. The distance between the linear photosensor array 340 and the lens assembly 330 may be referred to as the image distance Li. In the line-focus system, light beams 310, 312, 314 are emitted from the light source 308 and are focused or directed onto the barcode 350. The light beams 310, 312, 314 reflect off of the barcode 350 as reflected light beams 320, 322, 324. Line focus systems are described in U.S. patent application Ser. No. 08/888,339 of Kershner for CATADIOPTRIC LENS FOR A SCANNING DEVICE, which is hereby specifically incorporated by reference for all that is disclosed therein.

The reflected light beams 320, 322, 324 converge at the lens assembly 330. After converging at the lens assembly 330, the reflected light beams 320, 322, 324 are focused onto the linear photosensor array 340. The linear photosensor array 340 may, for example, be a single dimension array of photoelements, wherein each photodetector element corresponds to a small area location on the barcode 350. These small area locations on the barcode 350 are commonly referred to as "picture elements" or "pixels." The reflected light beams 320, 322, 324 travel from a corresponding pixel location on the barcode 350 to the linear photosensor array 340. Each photosensor pixel element in the linear photosensor array 340 (sometimes referred to simply as a "pixel") produces a data signal that is representative of the light intensity that it experiences. All of the photoelement data signals are received and processed by an appropriate data processing system 370.

In imaging devices, and particularly in a line-focus type imaging device as described above, it is preferable that the reflected light beams 320, 322, 324 from the barcode 350 be accurately aligned with and focused onto the linear photosensor array 340 in order to accurately image an object. In a typical line-focus scanning device, the reflected light beams 320, 322, 324 are transmitted by one or more optical components, such as the lens assembly 330 before reaching the linear photosensor array 340. Even a slight misalignment between any of these optical components and the linear photosensor array 340 will likely result in a corresponding degradation in image quality.

Scanning devices that include light beam alignment features are fully described in U.S. Pat. No. 5,646,394 of Steinle et al. for IMAGING DEVICE WITH BEAM STEERING CAPABILITY, U.S. Pat. No. 6,147,343 of Christensen for PHOTOELECTRIC IMAGING METHOD AND APPARATUS, and U.S. patent application Ser. No. 09/813,205 of Schmidtke et al. for METHOD AND APPARATUS FOR SETTING FOCUS IN AN IMAGING DEVICE, 2001 which are all hereby specifically incorporated by reference for all that is disclosed therein.

Typically, the optical components in an imaging device are mounted within an imaging device housing. The photosensor array is typically mounted to a circuit board, which, in turn, is mounted to the imaging device housing. A lens is also typically mounted within the imaging device housing. The lens serves to focus an image of an object onto the photosensor array. In order for the image to be accurately focused onto the photosensor array, and therefore the imaging device to function properly, the focus of the lens must be located at a precise position within the housing. Additionally the distance between the object and the lens assembly should remain constant. By retaining the object distance, the overall quality of the image remains constant.

After a conventional imaging device is assembled, the image distance Li (FIG. 1) is generally adjusted once to focus an object located at the object distance Lo (FIG. 1). Typically, this is done by adjusting the distance between the lens and the photosensor array, i.e., the image distance Li (FIG. 1) of the optical system, until the proper focus is achieved. To accomplish this, imaging devices are commonly provided having a reference surface or surfaces for locating the lens relative to the photosensor array. These reference surfaces typically allow the lens to translate in only one degree of movement, i.e., in directions toward or away from the photosensor array, but prevent the lens from being displaced in other directions.

Imaging devices also typically include a bracket or some other retention device to lock the lens in place against the reference surface or surfaces after the focus of the imaging system has been set. The bracket may, for example, be secured by a screw. Accordingly, the screw may be loosened when it is desired to move the lens in order to focus the system, and then tightened to lock the lens in place when the proper focus has been achieved. This adjustment is for preliminary focusing and calibration of the system at the time of manufacturing and is typically not capable of adjustment while the system is in operation.

FIG. 2 schematically illustrates a focus setting device 400 which may be used to set the focus of an imaging device. The focus setting device 400 may generally include a fixture 410 and a moveable arm 420. The fixture 410 is adapted to securely hold a sidewall 46 of a device, as shown. A moveable arm 420 may be adapted to move in the directions indicated by the arrows 422, 424 and may include a transverse portion 426 which is adapted to engage a lens assembly 260, as shown. To set the focus of the imaging device, the sidewall 46 may be placed into the fixture 410 of the focus setting device 400, as shown in FIG. 2. The lens assembly 260 may be placed onto a lens mounting area. A lens retention member 262 may then be placed over the lens assembly 260 and tightened. The resulting focus setting is a one-time setup procedure typically performed by the manufacturer.

SUMMARY OF THE INVENTION

Disclosed herein is a method of adjusting the focus of an imaging apparatus in a media library device of the type adapted to store a plurality of media storage devices. The method may comprise providing the imaging apparatus with at least one lens, providing a movable housing and movably mounting the imaging apparatus to the movable housing. The method may further comprise providing a picker assembly movably mounted on the movable housing, contacting at least one of the media storage devices with the picker assembly and adjusting the focus of the imaging apparatus by contacting at least a portion of the imaging apparatus with the picker assembly.

Further disclosed herein is a media library device of the type adapted to store a plurality of media storage devices. The media library device may comprise a movable housing and an imaging apparatus comprising at least one lens. The imaging apparatus may be mounted to the movable housing and movable relative to the movable housing, and an assembly movably mounted to the movable housing. The media library device has at least a first operating condition and a second operating condition. In the first operating condition, the imaging apparatus is at a first position relative to the movable housing, the assembly is at a second position relative to the movable housing and at least a portion of the assembly is in contact with at least a portion of the imaging apparatus. In the second operating condition, the imaging apparatus is at a third position relative to the movable housing, the assembly is at a fourth position relative to the movable housing.

Further disclosed is a method of adjusting the focus of an imaging apparatus in a media library device of the type adapted to store a plurality of media storage devices. The method may comprise providing the imaging apparatus with at least one lens, mounting the imaging apparatus to a movable housing and moving the movable housing to a position adjacent a first one of the plurality of media storage devices, the housing being a first distance from the first one of the plurality of media storage devices. Additionally, using the imaging apparatus to form an image of at least a portion of the first one of the plurality of media storage devices. The method may further comprise moving the movable housing to a position adjacent a second one of the plurality of media storage devices, the housing being a second distance from the second one of the plurality of media storage devices. The method may further comprise adjusting the focus of the imaging system and using the imaging apparatus to form an image of at least a portion of the second one of the plurality of media storage devices Further disclosed is an imaging system for forming images of a plurality of objects. The imaging system may comprise at least one member and at least one imaging assembly movably attached to the member. The at least one imaging assembly comprising at least one lens and at least one photosensor. Additionally, the imaging assembly comprises at least a first condition, and a second condition. In the first condition the lens is in imaging relationship with the at least a first of the plurality objects, the lens is located at a first distance from the first of the plurality objects and the imaging assembly is located at a first position relative to the member. In the second condition the lens is in imaging relationship with at least second of the plurality of objects, the lens is located at the first distance from the second of the plurality of objects and the imaging assembly is located at a second position relative to the member. Wherein the second position is different from the first position.

DETAILED DESCRIPTION OF THE INVENTION

Figure 3:
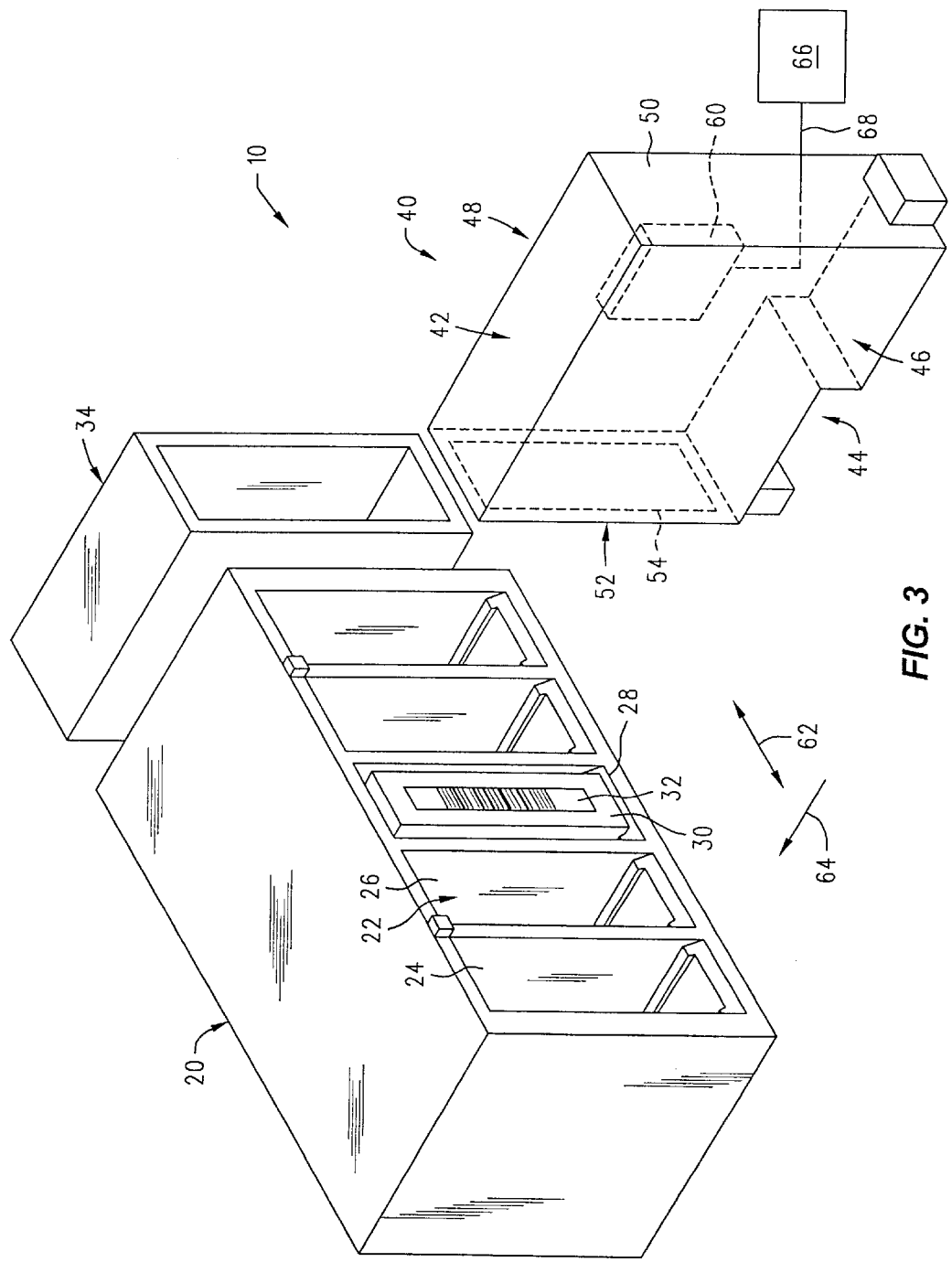
FIG. 3 is a perspective view of a media library device including a media handling device and a media magazine according to an embodiment of the present invention.

FIG. 3 schematically illustrates a media library device 10. It is noted that a media library device 10 may be a device used for storing and accessing data. Data in media library devices may be stored on storage devices such as digital linear tapes, optical disks, or the like. The media library device 10 may be a subcomponent of a media autochanger.

Media library device 10 may be a conventional media library device and may, for example, be of the type disclosed in any of the following U.S. Pat. Nos. 6,194,697 of Gardner for CALIBRATION SYSTEM FOR AN IMAGING APPARATUS AND METHOD and 6,164,543 of Kato et al. for METHOD OF DECIPHERING BAR CODES, and in the following U.S. patent applications Ser. No. 09/290,842 of Gardner for OPTICAL ASSEMBLY HAVING LENS OFFSET FROM OPTICAL AXIS; Ser. No. 09/291,242 of Gardner et al. for GUIDANCE SYSTEM AND METHOD FOR AN AUTOMATED MEDIA EXCHANGER; Ser. No. 09/290,429 of Gardner et al. for IMAGING APPARATUS ALIGNMENT SYSTEM AND METHOD; Ser. No. 09/290,926 of Gardner, et al. for AUTOMATED OPTICAL DETECTION SYSTEM AND METHOD; and Ser. No. 09/290,216 of Gardner for ALIGNMENT APPARATUS AND METHOD FOR AN IMAGING SYSTEM, Ser. No. 09/312,618 of Mueller et al. for PICKER INDEXING AND MULTIMEDIA CARTRIGE REFERENCING SPRING, file May 17, 1999, which are all hereby specifically incorporated by reference for all that is disclosed therein.

Referring to FIG. 3, media library device 10 may include at least one media magazine 20, at least one media play/record device 34 and at least one media handling device 40. Magazine 20 may include a plurality of slots 22, such as the individual slots 24, 26, 28. The slots 22 may be adapted to receive media storage devices, such as a media storage device 30 shown housed within the slot 28. Media storage device 30 may be any type of media storage device, for example, a conventional digital linear tape cartridge. Media storage device 30 may include a barcode label 32 affixed thereto that serves to uniquely identify the media storage device 30.

Media handling device 40 may be in the form of a generally parallelepiped structure having a top wall 42, an oppositely disposed bottom wall 44, a left sidewall 46 and an oppositely disposed right sidewall 48, a rear wall 50 and an oppositely disposed front wall 52. Front wall 52 may include a generally rectangular opening 54 therein. An imaging device 60 which may, as an example, be a barcode reader, may be mounted to an inside surface 80 (FIG. 4) of the media handling device sidewall 46 as shown. Imaging device 60 may be attached to a computer processor 66 via a data connection 68. The imaging device 60 may serve to read barcode labels on the media storage devices, such as the barcode label 32 on the media storage device 30, in order to determine the identity of a specific media storage device.

The media handling device 40 is moveable in a transverse direction 62 relative to the media magazine 20. In this manner, the media handling device 40 may be selectively positioned adjacent any of the slots 22 of the media magazine 20. A picker assembly actuator 70 (FIG. 4) located within the media handling device 40 is forwardly and reversibly moveable in a plunge direction 64 and is adapted to selectively engage a media storage device, such as the media storage device 30. In this manner, the media handling device 40 is able to move media storage devices between the media magazine 20 and one or more media playing/recording devices 34 located within the media library device 10.

Figure 5:
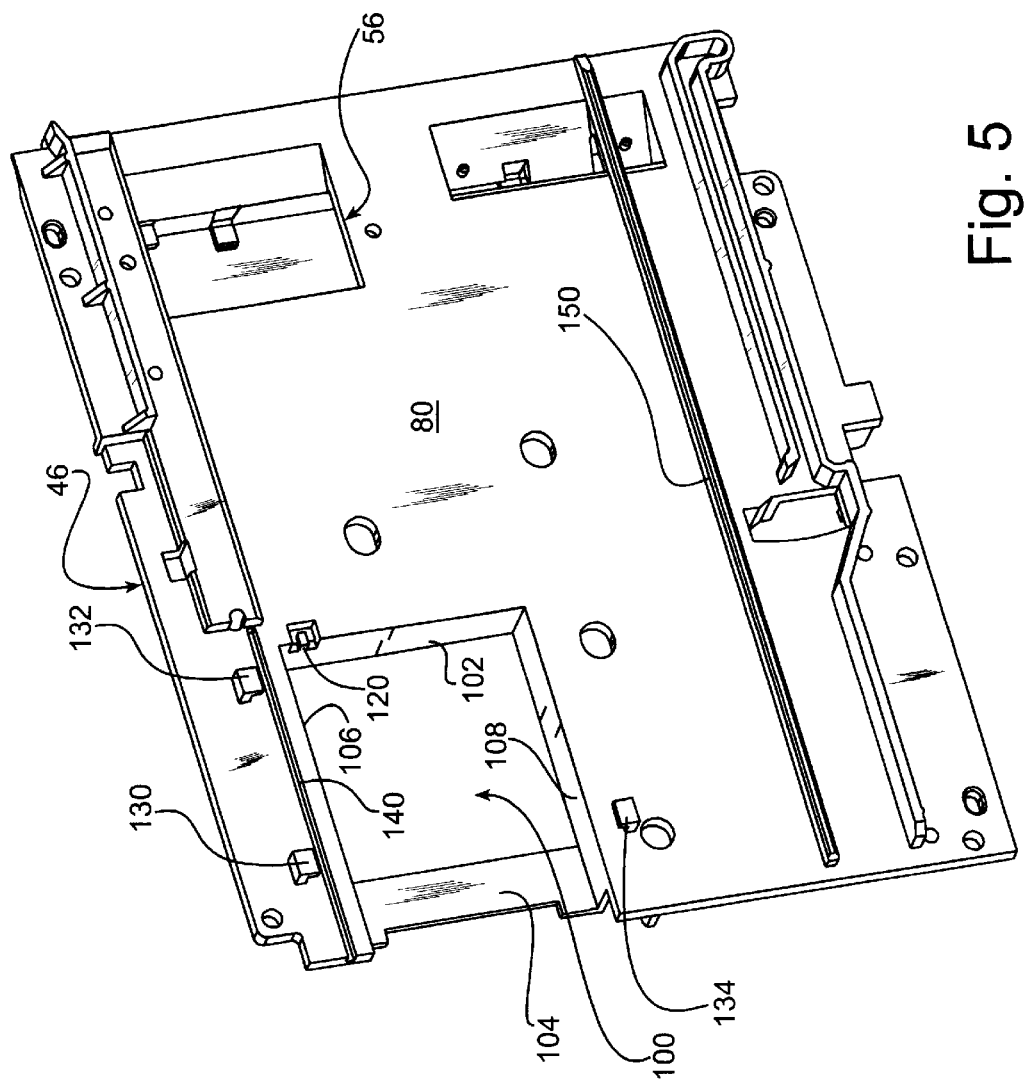
FIG. 5 is a perspective view of an inside portion of the wall portion of the media handling device of FIG. 4.

Referring to FIG. 5, the media handling device sidewall 46 may be provided with an imaging apparatus opening 100, a sidewall hook 120, a plurality of tabs 130, 132, 134, a linear track 140 and a guide rib 150. The imaging apparatus opening 100 may be provided with a front portion 102 and an oppositely disposed rear portion 104. The imaging apparatus opening 100 may be further provided with a left portion 106 and an oppositely disposed right portion 108. The sidewall hook 120 may be provided at the opening front portion 102. The plurality of tabs 130, 132, 134 may be provided on the inner surface 80 of the media handling device sidewall 46. The linear track 140 may be a groove in the exemplary embodiment provided on the inner surface 80 of the media handling device sidewall 46. The guide rib 150 may be provided on the inner surface 80 of the media handling device sidewall 46.

Figure 6:
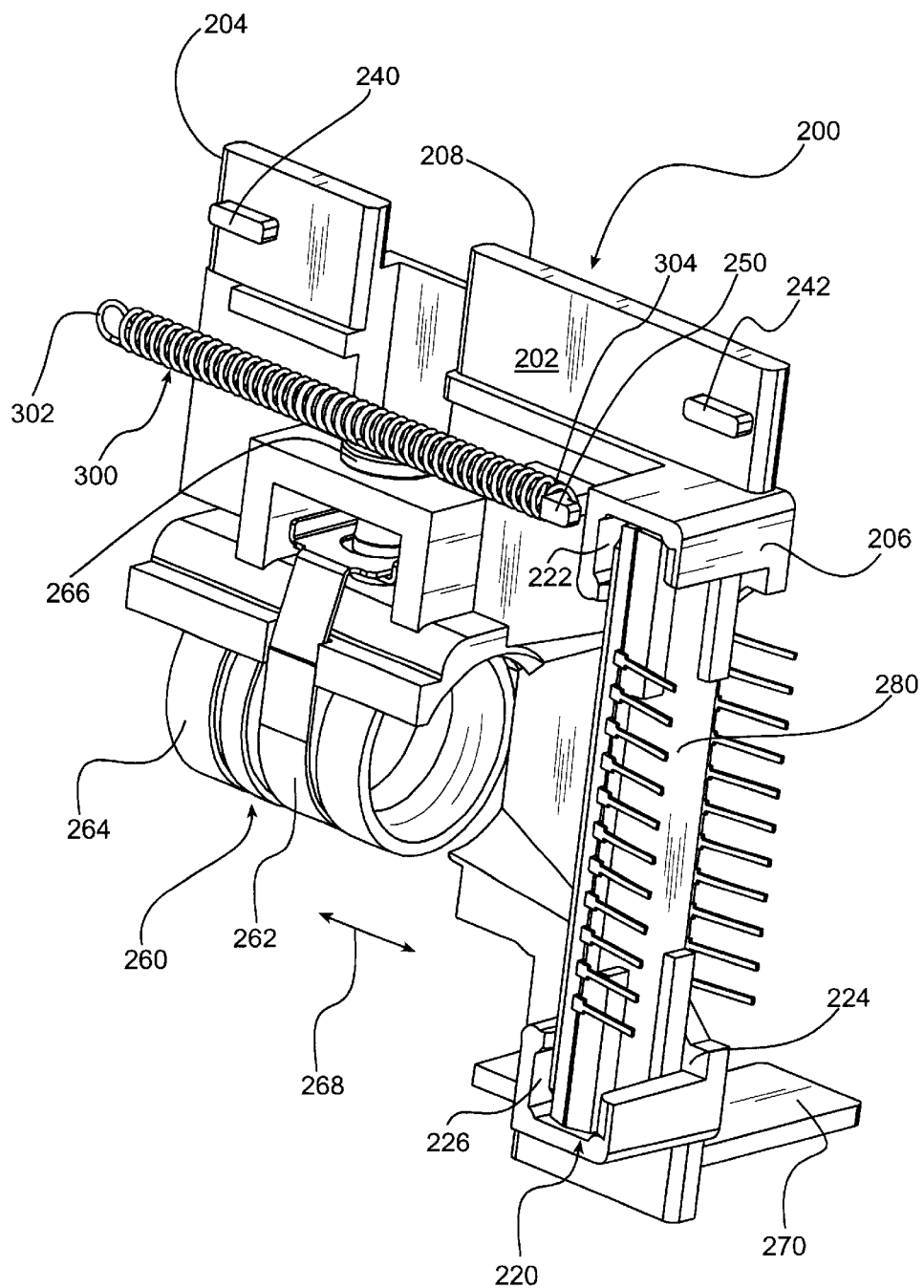
FIG. 6 is a perspective view of a bottom side of an imaging assembly and a stored force member according to an embodiment of the present invention.

Referring to FIG. 6, an imaging assembly 200 may be provided with a bottom portion 202, an oppositely disposed top portion 208, a rear portion 206 and an oppositely disposed front portion 204. The imaging assembly 200 may be provided with a variety of features such as an imaging device slot 220, a first linear track member 240, a second linear track member 242, an imaging assembly hook 250, a lens assembly 260, a protrusion 270 and a linear photosensor array 280. The imaging device slot 220 may be provided with a plurality of bearing surfaces 222, 224, 226; additionally, the imaging device slot 220 may be provided near the rear portion 206 on the bottom portion 202 of the imaging assembly 200.

Figure 8:
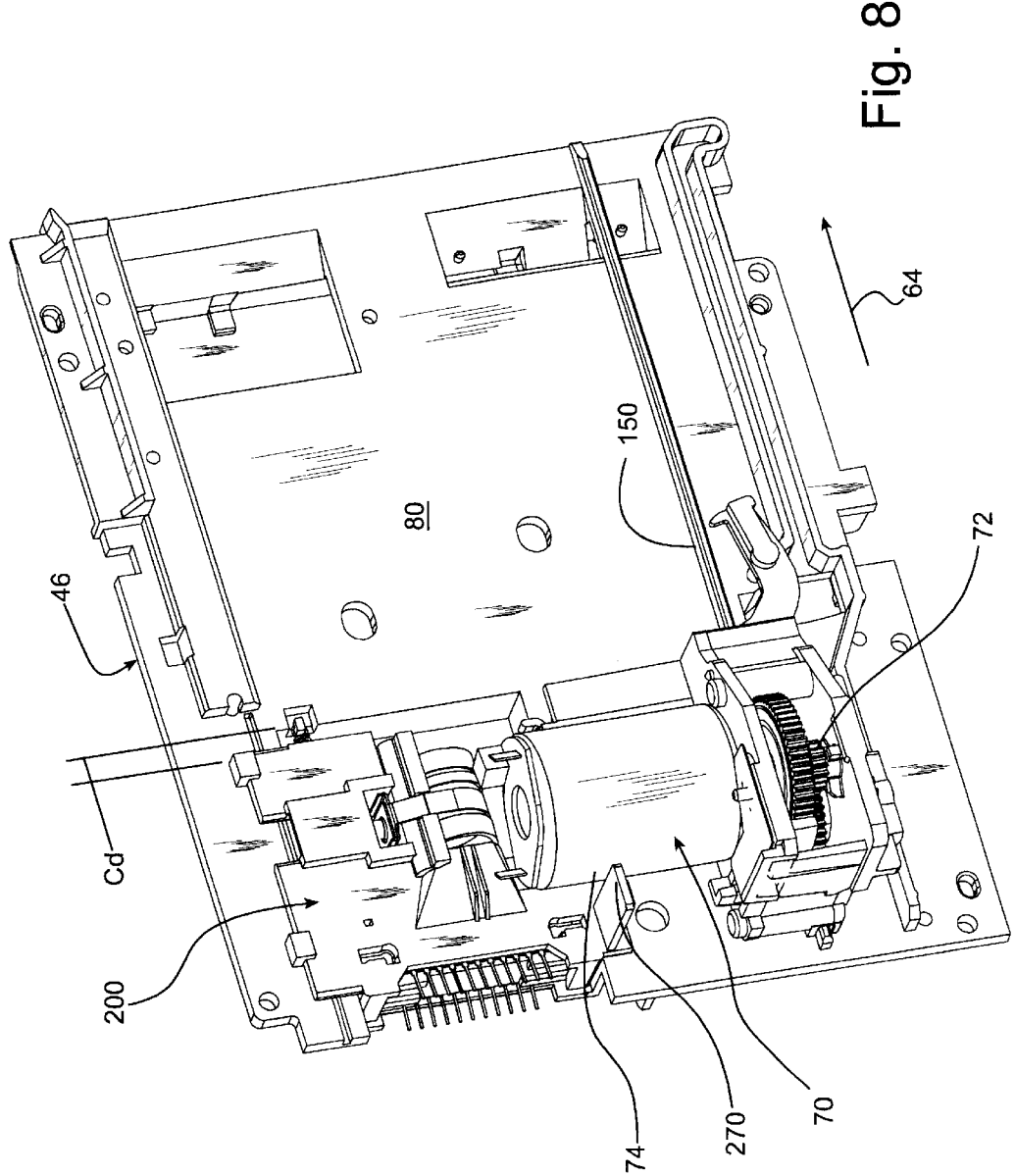
FIG. 8 is a perspective view of the assembly of FIG. 7 in a second position.
Figure 9:
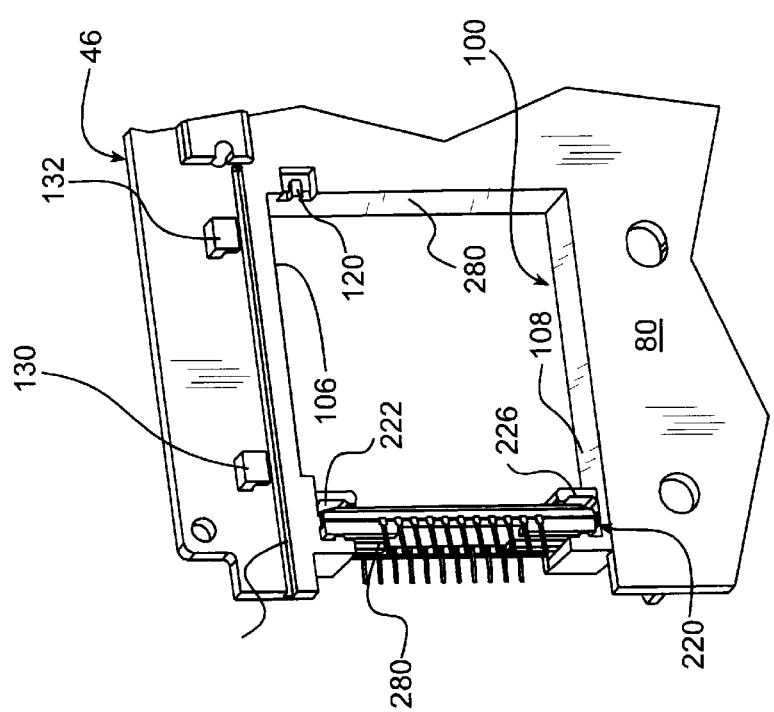
FIG. 9 is a cut-away perspective view of another exemplary embodiment of an inside portion of a wall portion of the media handling device having a fixed linear photosensor array according to the present invention.

The imaging device slot 220 may be provided to retain and align the linear photosensor array 280 relative to the imaging assembly. In this manner, the plurality of bearing surfaces 222, 224, 226 serve to align the linear photosensor array 280 with the lens assembly 260. The linear photosensor array 280 may, for example, be of the type commercially available from NEC Corporation of Japan and sold as Model No. uPD3734A. The imaging device slot 220 may, for example, be substantially identical to the photosensor mounting area described in U.S. Pat. No. 6,118,598, previously referenced, except that the imaging device slot 220 is integrally formed into the imaging assembly 200. In an additional exemplary embodiment, the imaging device slot 220 may be formed in the sidewall 46, as shown in FIGS. 8 and 9 and described later.

With further reference to FIG. 6, the first and second linear track members 240, 242 may be protrusions provided on the bottom portion 202 of the imaging assembly for engaging the media handling device sidewall linear track 140 (FIG. 5). The imaging assembly hook 250 may be provided on the bottom portion 202 of the imaging assembly 200.

As shown in an exemplary embodiment in FIG. 6, a band 262 may circumferentially capture the lens assembly 260. The band 262 and the lens assembly 260 may be attached to the imaging assembly 200 by a screw 266. The lens assembly 260 may translate in the imaging assembly 200 in an adjustment direction 268 for preliminary focusing. The preliminary focusing of the lens assembly 260 may occur prior to tightening the screw 266 as previously described for calibration of the device. After the screw 266 is tightened, the lens assembly 260 may be fixed at a predetermined position with respect to the image assembly 200. The protrusion 270 may be provided on the top portion 208 of the imaging assembly 200.

A spring 300 may be provided with a first end portion 302 and an oppositely disposed second end portion 304. The end portions 302, 304 are preferably formed into loops for readily attaching to hooks, such as the sidewall hook 120 and the imaging assembly hook 250.

Figure 7:
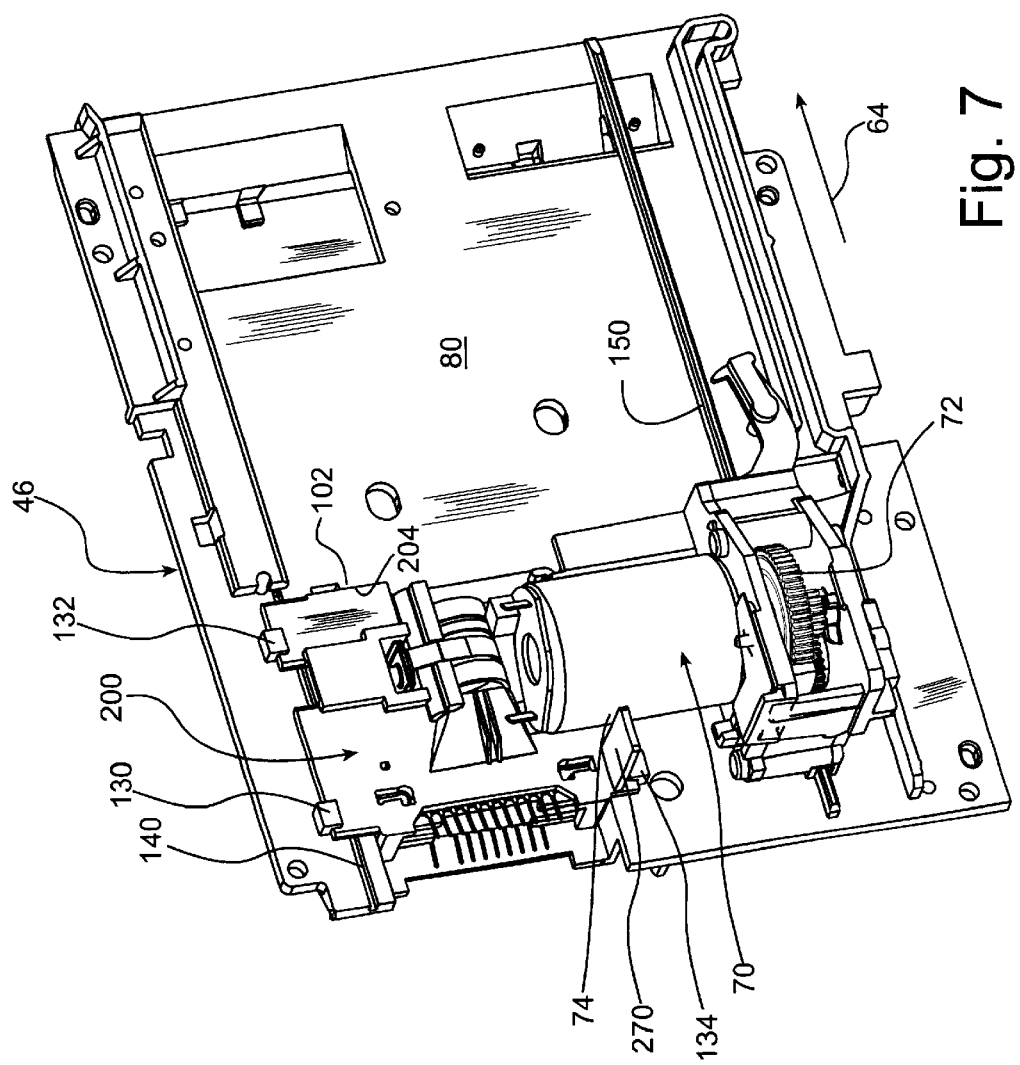
FIG. 7 is a perspective view of an exemplary embodiment of the inside portion of the wall portion of the media handling device assembled with the imaging assembly and a spring in a first position according to the present invention.

Referring to FIG. 7, assembling the imaging assembly 200 in the sidewall 46 may entail slideably attaching the imaging assembly 200 to the media handling device sidewall 46 in the plunger direction 64. With the first linear track member 240 (FIG. 6) in contact with the sidewall linear track 140 (FIG. 5) and the imaging assembly bottom portion 202 (FIG. 6) in contact with the sidewall inside surface 80, the imaging assembly 200 slides under the sidewall tabs 130 and 134. As the first linear track member 240 on the imaging assembly 200 slides down the linear track 140 of the left sidewall 46, the tab 132 captures the imaging assembly 200. Additionally, as the imaging assembly 200 slides, the second linear track member 242 (FIG. 6) contacts the sidewall linear track 140. The imaging assembly 200 slides to a first position when the front portion 204 of the imaging assembly 200 contacts the front portion 102 of the left sidewall 46 as shown in FIG. 7. After slidingly installing the imaging assembly 200 to the first position as described above, the spring 300 is attached to the left sidewall 46 and the imaging assembly 200. Referring to FIG. 6, the attachment of the spring 300 may begin by placing the second end portion 304 of the spring 300 over the imaging assembly hook 250. Furthermore, the spring 300 is attached to the left sidewall 46 (FIG. 5) by placing the first end portion 302 over the sidewall hook 120 (FIG. 5). The spring 300 urges the imaging assembly 200 to one end of a range of travel. The range of travel may, for example, be 6 millimeters. The previous dimension is given for exemplary purposes and is considered to be a matter of design preference. As such, the range of travel may vary depending on the travel that is required for a particular application.

Referring to FIG. 7, having attached the spring 300 to the left sidewall 46 and the imaging assembly 200, the front portion 204 is urged against the front portion 102 and held in the first position by a force exerted by the spring 300. As shown in FIG. 7, the imaging assembly 200 is located in the first position, without being engaged with the picker assembly actuator 70.

Figure 4:
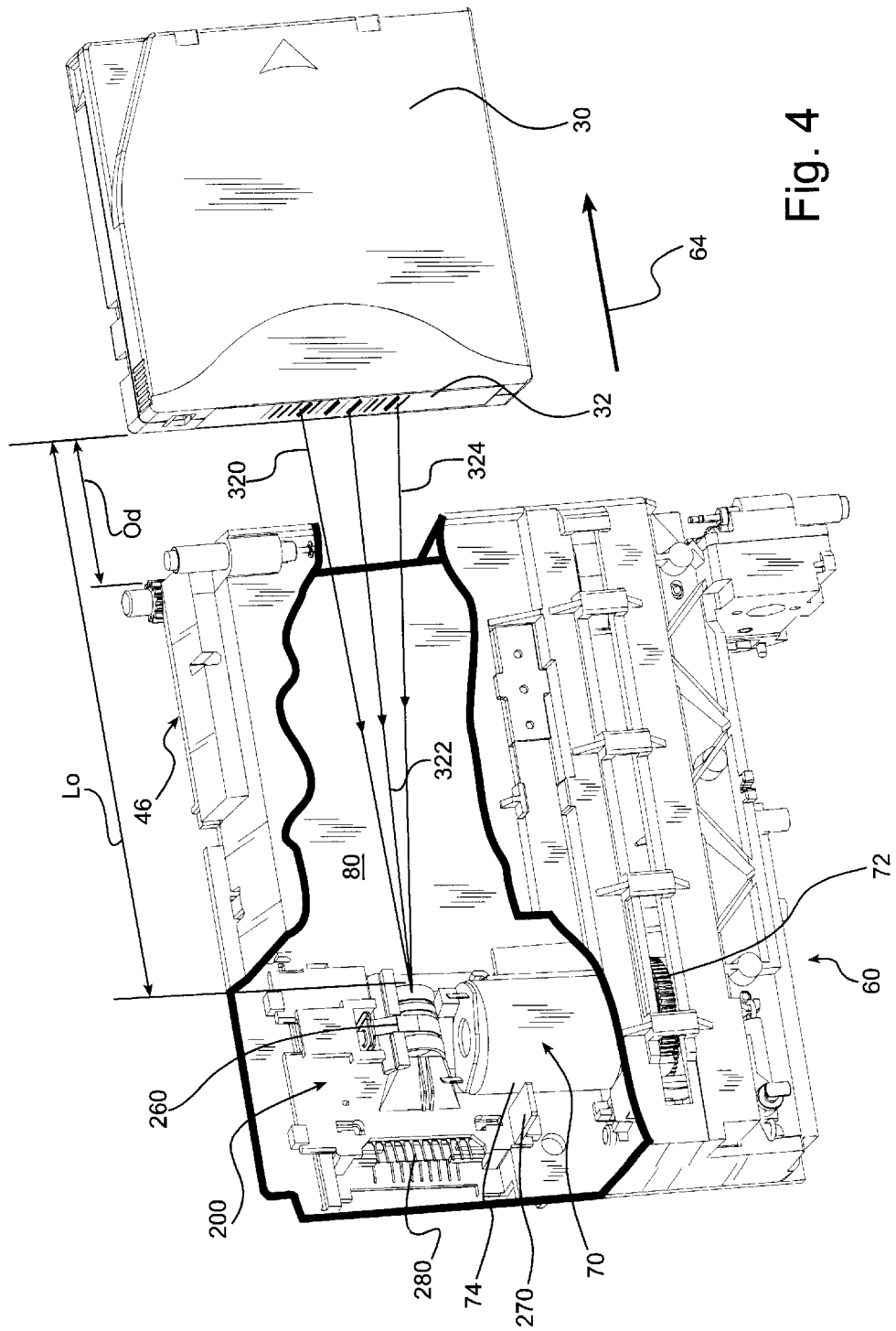
FIG. 4 is an exterior perspective view of a wall portion of the media handling device of FIG. 3.

Referring to FIG. 4, it has been found that, during operation of the media library device 10, an orientation distance Od between the imaging device 60 and the object being imaged (e.g., the barcode label 32) can vary. This variation in the orientation distance may, for example, be caused by the fact that different types of media play/record devices (such as the media play/record device 34, FIG. 3) may be used in conjunction with the media library device 10. The different types of media play/record devices may position the media storage device 30 at a slightly different orientation distance Od from the imaging device 60. Further, some media play/record devices may position the media storage device 30 at the orientation distance from the imaging device 60 that is different from the orientation distance at which the imaging device 60 was calibrated as previously described. As can be appreciated, such variations in the orientation distance Od will affect the focus of the imaging device 60. Inadequate focus detrimentally impacts the quality of the image received by the photosensor assembly, such as the linear photosensor array 280. The inadequate image results in errors in identifying objects such as the media storage device 30.

To compensate for different orientation distances Od, the imaging assembly 200 is capable of movement in the plunge direction 64 relative to the sidewall 46. Accordingly, variations in the orientation distance Od (FIG. 4) of an object being imaged may be compensated for by moving the imaging assembly 200 in the positive or negative plunge direction 64. This movement of the imaging assembly 200, in turn serves to restore the object distance Lo. The restoration of the object distance Lo allows focusing of the image on the linear photosensor array 280.

In order to focus the system, the picker assembly actuator 70 may be used to change the location of the imaging assembly 200. The picker assembly actuator 70 may be provided with a gear assembly 72 that interfaces with a toothed rack (not shown). When the picker assembly actuator 70 receives electronic instructions from the computer processor 66 to move, the gear assembly 72 rotates. Since the gear assembly 72 is in operational contact with the toothed rack, rotation of the gear assembly 72 causes movement of the picker assembly actuator 70. As the picker assembly actuator 70 moves, a contact portion 74 on the picker assembly actuator 70 contacts the protrusion 270. As the picker assembly actuator 70 moves in the negative plunge direction 64, the protrusion 270 and all elements operatively attached thereto move. Therefore moving the picker assembly actuator 70 causes movement of the imaging assembly 200 if the imaging assembly 200 is in contact with the picker assembly actuator contact portion 74. As the imaging assembly 200 moves, the image projected on the linear photosensor array 280 becomes focused at a predetermined position when the object distance Lo is restored. The predetermined position may be where the barcode label 32 was located during the calibration as discussed earlier. FIG. 8 shows the imaging assembly 200 in a second position, wherein the picker assembly actuator 70 has displaced the imaging assembly 200. At this second position, the imaging assembly 200 has been displaced by a controlled distance Cd.

Having described the movement of the imaging assembly 200 for focusing, one exemplary process of controlling the movement will now be described. The quality of the image may be monitored by a number of methods including software-based analysis. The computer processor 66 may have an imbedded software algorithm that may monitor the focus of the image on the linear photosensor array 280. The imaging assembly 200 reads the barcode label 32 with the linear photosensor array 280 and generates data that represents the barcode label 32. The data is sent in electronic format to the computer processor 66. The algorithm may evaluate the quality of the resulting data to determine if the image was readable. One exemplary method for determining if the image quality is sufficient may be that the algorithm evaluates the resulting signal generated by the linear photosensor array 280. In this exemplary method, the voltages created for white and black portions of the barcode label 32 may be compared to ensure that the voltage levels are sufficient. In the event that the barcode label 32 was successfully read, the media storage device 30 was properly identified and there is no further need to focus. However, if the data is determined to be insufficient, then the computer processor 66 may adjust the focus. The computer processor 66 may direct the picker assembly actuator 70 to move into contact with the imaging assembly protrusion 270. After contacting the imaging assembly protrusion 270, the picker assembly actuator 70 moves the imaging assembly 200 to a location and stops. After stopping, the computer processor 66 takes another image reading of the image on the linear photosensor array 280. The computer processor 66 evaluates the quality of the data to determine if the barcode label 32 was successfully read. In the event that the barcode label 32 was successfully read, the media storage device 30 was identified and focusing may terminate. However, if the data is determined to be compromised, then the computer processor 66 may adjust the focus again. This process of moving the imaging assembly 200 and evaluating the resulting data generated by the linear photosensor array 280 continues until the barcode label 32 is focused and identified. With the preceding example of how the movement of the imaging assembly 200 may be controlled, it can be appreciated that the imaging assembly 200 may be moved a required distance in order to obtain an adequate reading of the object such as barcode label 32. A description of typical operation sequence will now be provided. Referring to FIG. 3, the media storage device 30 located in the magazine slot 28 may contain data that needs to be retrieved. The computer processor 66 communicates with the media handling device 40 to locate the media storage device 30 and deliver it to the media play/record device 34.

The media handling device 40 moves in the transverse direction 62 until it is aligned with the media storage device 30. After locating the media storage device 30, the imaging device 60 reads the barcode label 32 located on the media storage device 30. If the barcode label 32 matches the required data, then the picker assembly actuator 70 advances in the plunge direction 64. The picker assembly actuator 70 advances through the opening 54 and captures the media storage device 30. Then the picker assembly actuator 70 retreats with the captured media storage device 30 into the media handling device 40 in the negative plunge direction 64. Once the media storage device 30 is inside the media handling device 40, the media handling device 40 moves in the transverse direction 62 to the media play/record device 34.

Upon aligning with the media play/record device 34, the picker assembly actuator 70 moves in the plunge direction 64. The movement of the picker assembly actuator 70 causes the media storage device 30 to egress from the media handling device 40 through the opening 54 and into the media play/record device 34. While the media storage device 30 is in the media play/record device 34, the media play/record device 34 locates and reads the required data. While the media play/record device 34 is reading the data, the media handling device 40 may be moving inside the media library device 10 performing similar locate, move and place operations.

Figure 1:
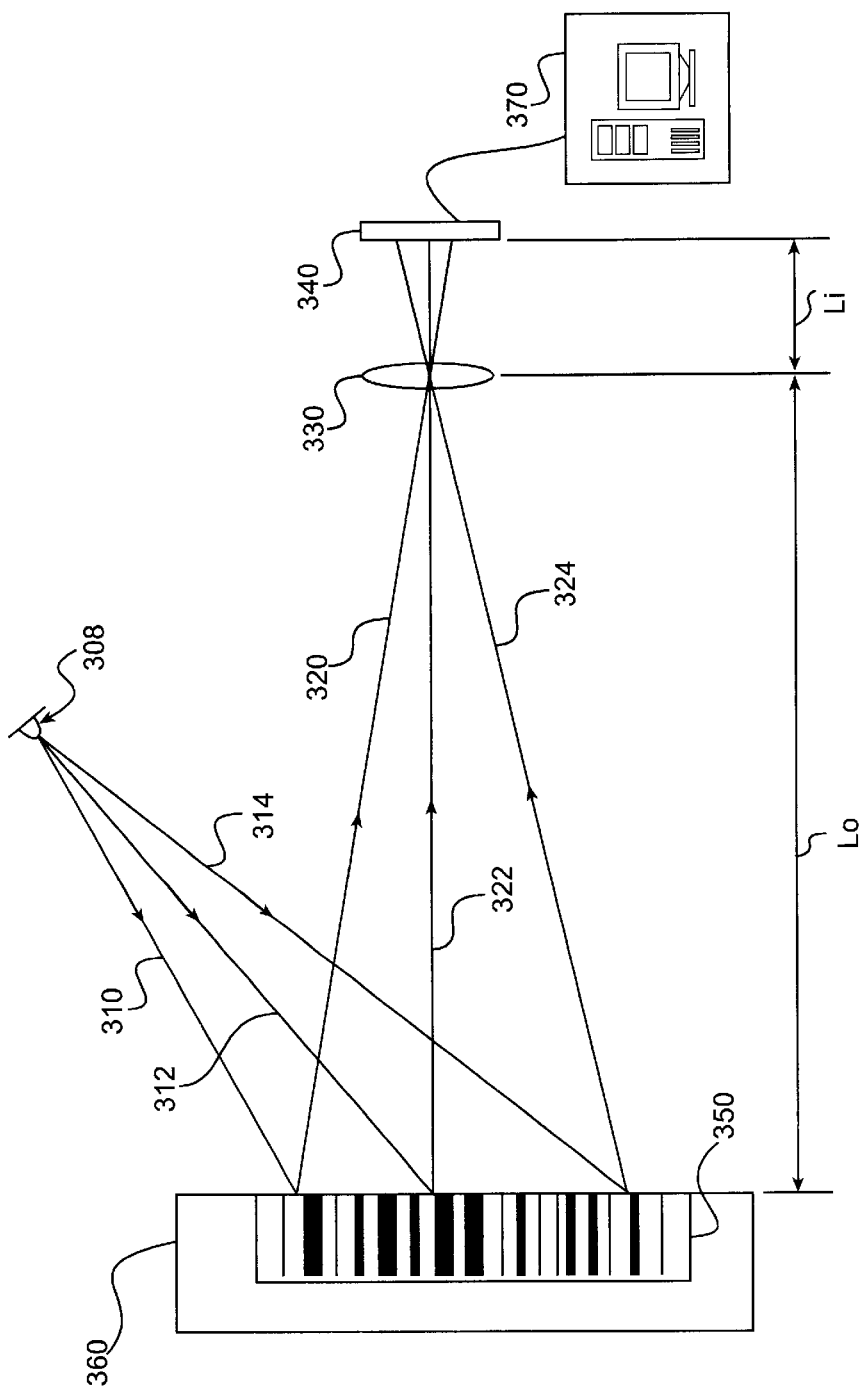
FIG. 1 is a schematic view of a conventional barcode reader.
Figure 2:
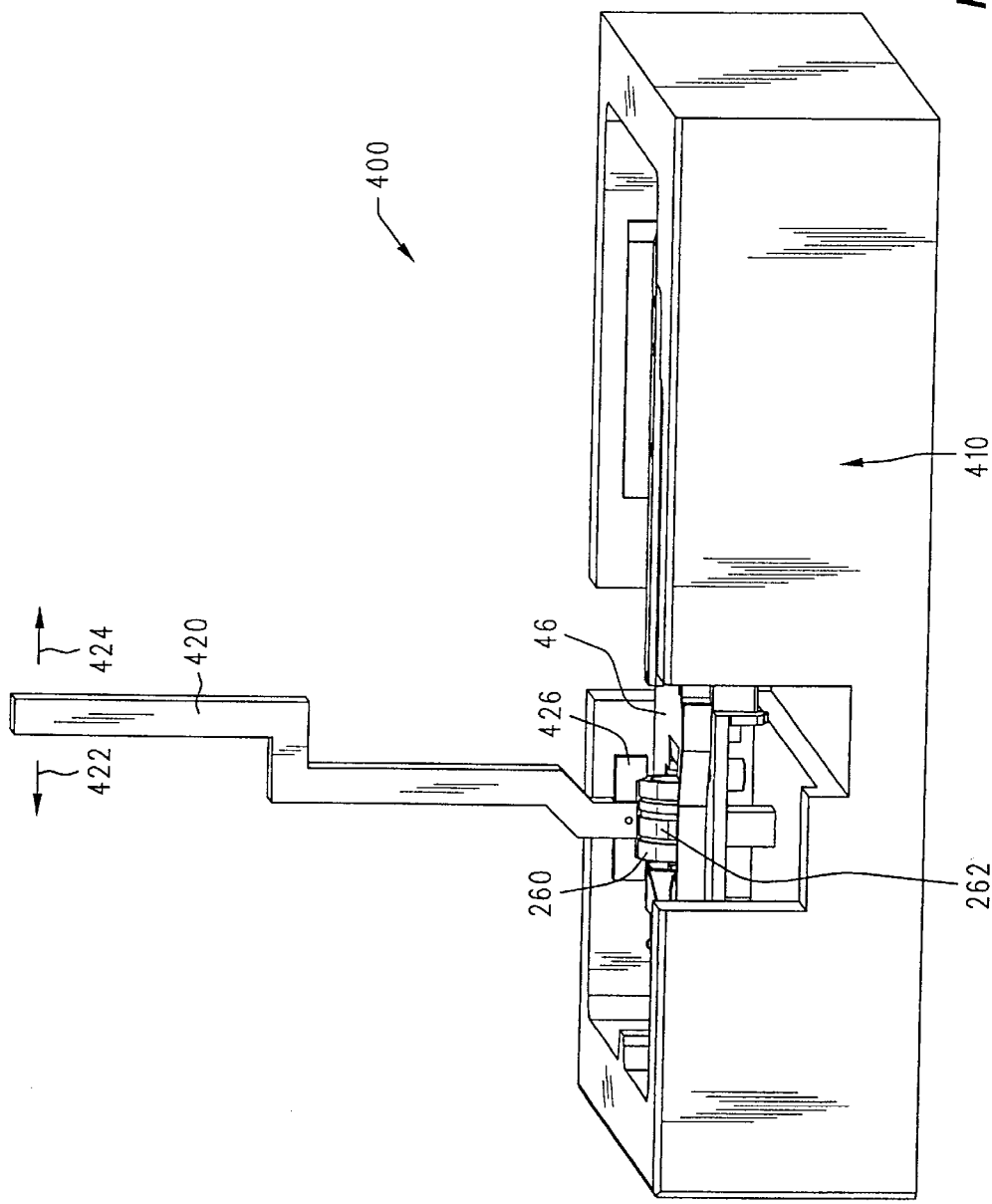
FIG. 2 is a schematic that illustrates a focus setting device used to set the focus of the barcode reader.

After the data has been read from the media storage device 30, the computer processor 66 may direct the media handling device 40 to return to the media play/record device 34 to remove the media storage device 30. Upon returning to the media play/record device 34, the media storage device 30 is identified by reading the barcode label 32. Referring to FIG. 4, reading the barcode label 32 on the media storage device 30 is accomplished by emitting light from the light source 308 (FIG. 1). Individual light beams such as light beams 310, 312, 314 (FIG. 1) emitted from the light source 308 and reflect off of the barcode label 32 as reflected light beams such as reflected light beams 320, 322, 324. The reflected light beams travel through the lens assembly 260 and are imaged onto the linear photosensor array 280. The computer processor 66 monitors the image of the linear photosensor array 280. If the image is not focused and the data is not adequately obtained, the imaging assembly 200 is moved. In the exemplary embodiment as shown, the imaging assembly 200 is moved by the picker assembly actuator 70 as previously described. The imaging assembly 200 is moved until the quality of the image is optimized. The process of optimizing the image quality is performed as previously described; however, in summary, a software algorithm integrated in the computer processor 66 monitors the quality of the image and accordingly focuses. After a suitable image is obtained, the picker assembly actuator 70 may advance to capture the media storage device 30. After capturing the media storage device 30, the media storage device 30 is removed from the media play/record device 34. The media storage device 30 is then returned to the media magazine 20 for storage until it is needed again. This operation and sequence may be repeated by the media library device 10 for various reading and writing operations as required.

Figure 10:
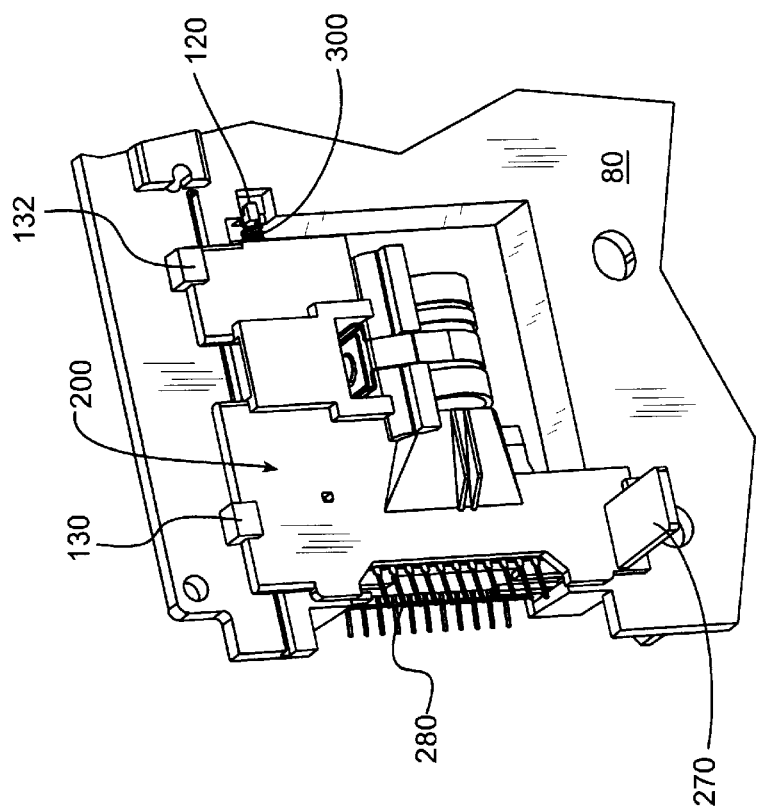
FIG. 10 is a cut-away perspective view of the exemplary embodiment of FIG. 9 with an imaging assembly.

As shown in FIGS. 9 and 10 and as previously mentioned, the imaging device 60 may also be directed to a fixed linear photosensor array in an additional exemplary embodiment. The image device slot 220 may be an integrated feature on the media handling device sidewall 46. The imaging assembly 200 is substantially similar as previously described, however the imaging device slot 220 is omitted. In this exemplary embodiment, the actuation of the picker assembly actuator 70 against the protrusion 270 causes movement of the imaging assembly 200 and all features operatively associated thereto. Since the lens assembly 260 is operatively associated with the imaging assembly 200, the lens assembly 260 moves. The movement of the lens assembly 260 in this exemplary embodiment results in a scaling of the image size projected on the linear photosensor array 280. The scaled image may be larger or smaller than the image obtained during calibration, which may be beneficial in certain applications. The exemplary embodiment as shown in FIGS. 9 and 10 results in a focused barcode image capable of being converted to machine-readable image data.

In an exemplary embodiment as shown, the spring 300 is an extension spring capable of applying force to objects to which it is attached. Other examples of members that may be used to apply force include elastic bands, pneumatic cylinders, hydraulic cylinders, bumpers, or their equivalents.

It can be appreciated by those skilled in the art that any number of linear displacement mechanisms may be provided to move the imaging assembly 200. It is preferable, however, that the picker assembly actuator 70 be used to move the imaging assembly 200 because the picker assembly actuator 70 is an existing component in many media handling devices 40. Additionally, there are space constraints within the media handling device 40 and additional components may increase the exterior dimensions of the media handling device 40. Since the picker assembly actuator 70 is an existing component, the overall size of the media handling device 40 remains the same. Substitutes for the picker assembly actuator 70 have been contemplated, including: providing elements such as a threaded rod and a nut, a solenoid, pneumatic bellows, linear actuators, rotary actuators, or their equivalents.

As previously presented, an exemplary process of controlling movement of the imaging assembly 200 may be accomplished with a software-based algorithm. Other processes of controlling the quality of the image have been contemplated. Two of these processes will be presented herein for exemplary purposes, one process being a database process and the other being a plurality-of-locations process.

The database process may be an integrated feature in the computer processor 66, FIG. 3. The integrated database contains information as to what position the barcode label 32 is located at for a particular play/record device 34 or media magazine 20. Based on the particular location of the barcode label 32, the computer processor 66 'looks up' the corresponding position of the imaging assembly 200 that results in a focused image on the linear photosensor array 280. The computer processor 66 directs the picker assembly actuator 70 to move the imaging assembly 200 to the position that was 'looked up' whereat the image on the linear photosensor array 280 is focused. Upon positioning the imaging assembly 200 whereat the image is focused, data may be obtained from the linear photosensor array by the computer processor 66.

Another alternative method for obtaining a quality image may be a plurality-of-locations process. The plurality of locations may correspond to various locations of the barcode label 32 on media storage devices 30 located in various play/record devices 34 or media magazines 20. For example, if there are three different media play/record devices 34 and one type of media magazine 20, there would be four locations of the barcode label 32 (assuming that each device positions the media storage device 30 and the barcode label 32 attached thereto at unique locations). The computer processor may direct the picker assembly actuator 70 to move the imaging assembly 200 to one of the four locations and capture an image of the barcode label 32. The process of moving the imaging assembly 200 to the remaining three locations and capturing three additional images may occur. The computer processor 66 evaluates the four images captured by the linear photosensor array 280 and utilizes the best image to identify the media storage device 30. With this plurality-of-locations process, the process may be terminated if a focused image is found in one of the earlier readings, rather than cycling through all four locations.

In another exemplary embodiment, the computer processor 66 may be provided with a database used for optimizing the speed of the system. The database may be used to store the locations at which optimal focusing of objects, such as barcode label 32, occurred for the various components, such as media storage device 30, housed within the media library device 10. By storing the locations of the optimal focused barcode label 32, the system may move the imaging assembly 200 to the focused position prior to reading the barcode label 32. This predetermined movement allows for efficient reading of barcode labels 32, thereby improving overall data recovery speeds.

The adjustable focus imaging device is capable of reading images such as the barcode 32 on objects such as the media storage device 30. This reading can be made even though the location of the media storage device 30 may vary. The device utilizes an existing member such as the picker assembly actuator 70 for moving the imaging assembly 200, although other variations have been contemplated and disclosed herein. The overall size and manufacturing cost of the adjustable focus imaging device remains substantially similar to the prior art device.

It is noted that the foregoing has been described in conjunction with a barcode reader in a media handling device for purposes of illustration only. The apparatus and methods described herein could alternatively be used in a barcode reader in any application, such as a fixed barcode reader on an assembly line or a hand-held barcode scanner. They could also be used in imaging systems other than barcode readers. Examples include optical scanning devices, photocopiers and telefax machines.

It is noted that the various numeric dimensions and specifications used throughout this description are provided for exemplary purposes only and are not to be construed as limiting, in any way, the invention recited in the appended claims.

What is claimed is:

1. A method of adjusting the focus of an imaging apparatus, said method comprising:
providing said imaging apparatus with at least one lens;
providing a movable housing;
movably mounting said imaging apparatus to said movable housing;
providing a picker assembly movably mounted on said movable housing;
contacting at least one media storage device with said picker assembly; and
adjusting the focus of said imaging apparatus by contacting at least a portion of said imaging apparatus with said picker assembly.

2. The method of claim 1 wherein said movably mounting said imaging apparatus comprises slidably mounting said imaging apparatus to said movable housing.

3. The method of claim 1 and further comprising:
providing a spring;
wherein, said spring applies a force to said imaging apparatus in a first direction; and
wherein said adjusting the focus comprises applying a force in a second direction, opposite of said first direction.

4. The method of claim 1 wherein said providing said imaging apparatus comprises providing said imaging apparatus with at least one photosensor.

5. The method of claim 1 wherein said adjusting the focus of said imaging apparatus comprises moving said imaging apparatus relative to said movable housing.

6. The method of claim 1 wherein said adjusting the focus of said imaging apparatus comprises moving said at least one lens relative to at least one photosensor.

7. A media handling device, comprising:
a movable housing;
an imaging apparatus comprising at least one lens, said imaging apparatus being mounted to said movable housing and being movable relative to said movable housing;
an assembly movably mounted to said movable housing;
wherein, said media handling device has at least a first operating condition and a second operating condition;
wherein, in said first operating condition, said imaging apparatus is at a first position relative to said movable housing, said assembly is at a second position relative to said movable housing and at least a portion of said assembly is in contact with at least a portion of said imaging apparatus; and
wherein, in said second operating condition, said imaging apparatus is at a third position relative to said movable housing and said assembly is at a fourth position relative to said movable housing.

8. The media handling device of claim 7, wherein in said second operating condition, said at least a portion of said assembly is not in contact with said at least a portion of said imaging apparatus.

9. The media handling device of claim 8 wherein said imaging apparatus further comprises at least one photosensor.

10. The media handling device of claim 7 wherein said assembly comprises a motor.

11. The media library device of claim 7 wherein said assembly comprises a picker assembly actuator.

12. A method of adjusting the focus of an imaging apparatus, said method comprising:
providing said imaging apparatus with at least one lens;
mounting said imaging apparatus to a movable housing;
moving said movable housing to a position adjacent a first one of a plurality of media storage devices wherein said housing is a first distance from said first one of said plurality of media storage devices;
using said imaging apparatus to form an image of at least a portion of said first one of said plurality of media storage devices;
moving said movable housing to a position adjacent a second one of said plurality of media storage devices wherein said housing is a second distance from said second one of said plurality of media storage devices;
adjusting the focus of said imaging system after said moving said movable housing to a position adjacent a second one of said plurality of media storage devices; and using said imaging apparatus to form an image of at least a portion of said second one of said plurality of media storage devices.

13. The method of claim 12 wherein:
said providing said imaging apparatus further comprises providing said imaging apparatus with at least one photosensor.

14. The method of claim 12 wherein:
said adjusting the focus of said imaging system further comprises moving said lens relative to at least one photosensor.

15. The method of claim 12, and further,
wherein said moving said movable housing to said position adjacent to said first one of said plurality of media storage devices comprises moving said movable housing in a first direction;
wherein said adjusting the focus of said imaging system comprises moving said imaging apparatus in a second direction; and
wherein, said first direction is transverse to said second direction.

16. An imaging system for forming images of a plurality of objects, comprising:
at least one member;
at least one imaging assembly movably attached to said member;
said at least one imaging assembly comprising at least one lens and at least one photosensor;
wherein said imaging assembly comprises at least a first condition, and a second condition;
wherein, in said first condition:
said lens is in imaging relationship with at least a first of said plurality objects;
said lens is located at a first distance from said at least a first of said plurality objects; and
said imaging assembly is located at a first position relative to said member;
wherein, in said second condition:
said lens is in imaging relationship with at least a second of said plurality of objects;
said lens is located at said first distance from said at least a second of said plurality of objects; and
said imaging assembly is located at a second position relative to said member; and
wherein said second position is different from said first position.

17. The imaging system of claim 16, wherein said member forms a part of a picker assembly in a media library device.

18. The imaging system of claim 16 wherein:
in said first condition, said member is at a first location; and
in said second condition, said member is at a second location which is different from said first location.

19. The imaging system of claim 16 wherein, said imaging assembly further comprises:
a third condition, in which:
said lens is in imaging relationship with said at least a second of said plurality of objects;
said lens is located at a second distance from said at least a second of said plurality of objects; and
wherein said second distance is different from said first distance.

20. The imaging system of claim 19 wherein, in said third condition, said imaging assembly is located at said first position relative to said member.

21. The imaging system of claim 16 wherein said imaging assembly is linearly movable relative to said member.

22. The imaging system of claim 16 wherein:
said member is movable in a first direction;
said imaging assembly is linearly movable in a second direction; and
said second direction is transverse to said first direction.

23. A media library system comprising:
a movable housing;
an imaging apparatus comprising at least one lens, said imaging apparatus being mounted to said movable housing and being movable relative to said movable housing;
wherein, said media library system has at least a first operating condition and a second operating condition;
wherein, in said first operating condition, said imaging apparatus is at a first position relative to said movable housing;
wherein, in said second operating condition, said imaging apparatus is at a second position relative to said movable housing; and
wherein, said first position is different from said second position.

24. The media library system of claim 23 wherein said imaging apparatus further comprises at least one photosensor.

25. The media library system of claim 23 and further comprising:
an assembly movably mounted to said movable housing;
wherein, in said first operating condition, said assembly is at a third position relative to said movable housing and at least a portion of said assembly is in contact with at least a portion of said imaging apparatus;
wherein, in said second operating condition, said assembly is at a fourth position relative to said movable housing; and
wherein, said fourth position is different from said third position.

26. The media library system of claim 25, wherein in said second operating condition, said at least a portion of said assembly is not in contact with said at least a portion of said imaging apparatus.

27. The media handling device of claim 25 wherein said assembly comprises a motor.

28. The media library device of claim 25 wherein said assembly comprises a picker assembly actuator.

29. An imaging system for forming an image of at least one object, said imaging system comprising:
at least one member;
at least one imaging assembly movably attached to said member;
said at least one imaging assembly comprising at least one lens and at least one photosensor;
wherein said at least one imaging assembly comprises at least a first condition, and a second condition;
wherein, in said first condition:
said lens is located at a first distance from said at least one object; and
said imaging assembly is located at a first position relative to said member;
wherein, in said second condition:
said lens is located at a second distance from said at least one object; and
said imaging assembly is located at a second position relative to said member; and wherein said second distance is different from said first distance and said second position is different from said first position.

30. The imaging system of claim 29, wherein said member forms a part of a picker assembly in a media library device.

31. The imaging system of claim 29 wherein said imaging assembly is linearly movable relative to said member.

32. The imaging system of claim 29 wherein:

said member is movable in a first direction;

said imaging assembly is linearly movable in a second direction; and said second direction is transverse to said first direction.

* * * * *